3,080,361
Patented Mar. 5, 1963

3,080,361
NEW DICHLORO PREGNADIENES AND METHOD OF PREPARING THE SAME
Milton Heller and Seymour Bernstein, New City, N.Y., assignors to American Cyanamid Company, New York, N.Y., a corporation of Maine
No Drawing. Filed Dec. 15, 1961, Ser. No. 159,750
3 Claims. (Cl. 260—239.55)

This invention relates to new steroid compounds. More particularly, it relates to dichloro-16α,17α-alkylidenedioxy-pregnadienes and methods of preparing the same.

The novel compounds of the present invention may be illustrated by the following formula:

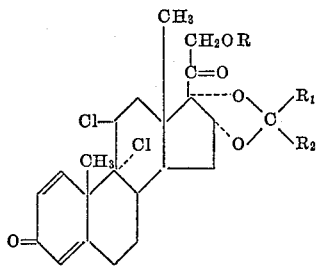

wherein R is a member of the group consisting of hydrogen and lower alkanoyl radicals, $R_1$ is a member of the group consisting of hydrogen and lower alkyl radicals, and $R_2$ is a lower alkyl radical.

The compounds of this invention are, in general, white crystalline solids, relatively insoluble in water, but relatively soluble in organic solvents such as acetone, ethyl alcohol, ethyl acetate, benzene, toluene, dimethylformamide, β-ethoxyethanol, 1,4-dioxane, diethyl ether, chloroform, dichloroethane and the like.

The compounds of the present invention can be prepared, for example, starting with 11β,21-dihydroxy-16α 17α - isopropylidenedioxy pregn - 4 - ene-3,20-dione (I) (Bernstein et al., J. Am. Chem. Soc., 81, 4573 (1959)). The above compound can be converted into the corresponding 21-lower alkanoyl derivatives by acylation with, for example, acetic anhydride. The compound obtained is 21-acetoxy-11β-hydroxy-16α,17α-isopropylidenedioxypregn-4-ene-3,20-dione (II). The latter compound on 1,2-dehydrogenation with, for example, 2,3-dichloro-5,6-dicyano-1,4-benzoquinone produces 21 - acetoxy-11β-hydroxy-16α,17α-isopropylidenedioxypregna - 1,4 - diene-3,- 20-dione (III). When the latter compound is treated with a brominating agent such as N-bromoacetamide or N-bromosuccinimide followed by treatment with sulfur dioxide the compound 21-acetoxy-16α,17α-isopropylidenedioxypregna-1,4,9(11)-triene-3,20-dione is obtained (IV). The dichloro compounds of the present invention are obtained by direct chlorination of (IV) to produce 21-acetoxy-9α,11β-dichloro-16α,17α-isopropylidenedioxypregna-1,4-diene-3,20-dione (V). On hydrolysis of the latter compound by treatment with, for example, perchloric acid in alcohol the compound 9α,11β - dichloro - 21 - hydroxy - 16α,17α - isopropylidenedioxypregna - 1,4-diene-3,20-dione is obtained. While in the above transformations $R_1$ and $R_2$ are methyl radicals, obviously other lower alkyl groups can be used in the starting steroids and the same transformations will take place.

The steroids of the present invention are active antiinflammatory agents. They are therefore useful in the treatment of arthritis, bursitis, burns, etc. These compounds can be used as the active component in pharmaceutical preparations such as tablets, capsules, pills, powders, etc.

The following examples illustrate in detail the preparation of representative compounds of the present invention.

EXAMPLE I

Preparation of 21-Acetoxy-11β-Hydroxy-16α,17α-Isopropylidenedioxypregn-4-Ene-3,20-Dione (II)

To a solution of 10.3 g. of 11β,21-dihydroxy-16α,17α-isopropylidenedioxypregn-4-ene-3, 20-dione (I) in 100 ml. of pyridine is added 10 ml. of acetic anhydride and the mixture is allowed to stand 18 hours at room temperature. The solution is poured into water and the resultant solid is filtered and dried. Recrystallization from acetone-petroleum ether gives the product of the example, melting point 249–252° C.

EXAMPLE II

Preparation of 21-Acetoxy-11β-Hydroxy-16α,17α-Isopropylidenedioxypregna-1,4-Diene-3,20-Dione (III)

A mixture of 1 g. of 21-acetoxy-11β-hydroxy-16α,17α-isopropylidenedioxypregna-4-ene-3,20-dione (II), 700 mg. of 2,3-dichloro-5,6-dicyano-1,4-benzoquinone and 10 ml. of dioxane is refluxed 20 hours, the mixture is cooled and filtered. The filtrate is evaporated under reduced pressure and the resultant residue dissolved in methylene chloride. The solution is put on 50 g. of activated magnesium silicate and the material on the column is chromatographed with acetone-petroleum ether mixtures. The elution fraction with acetone-petroleum ether (41:9) is concentrated to give 295 mg. of desired product. Recrystallization from acetone-petroleum ether gives the product of the example, melting point 248–250° C.

EXAMPLE III

Preparation of 21-Acetoxy-16α,17α-Isopropylidenedioxypregna-1,4,9(11)-Triene-3,20-Dione (IV)

To a solution of 4.065 g. of 21-acetoxy-11β-hydroxy-16α,17α - isopropylidenedioxypregna-1,4-diene-3,20-dione (III) in 40 ml. of dry pyridine is added 1.845 g. of N-bromoacetamide. The resultant mixture is allowed to stand in the dark at room temperature for 20 minutes. The solution is placed in an ice-bath and sulfur dioxide gas is bubbled into the reaction mixture until a negative test is obtained with starch-iodide paper. Dropwise addition of 100 ml. of water to the solution gives crystals which are collected by filtration. Recrystallization from dilute acetone gives the product of the example, melting point 214.5–216° C.

EXAMPLE IV

Preparation of 21-Acetoxy-9α,11-Dichloro-16,17-Isopropylidenedioxypregna-1,4-Diene-3,20-Dione (V)

To a stirred solution of 1 g. of 21-acetoxy-16α,17α-isopropylidenedioxypregna - 1,4,9(11) - triene-3,20-dione (IV) in 40 ml. of carbon tetrachloride and 0.6 ml. of pyridine is added a solution of chlorine in tetrahydrofuran (ca. 3 ml.) An imediate precipitate appears. The suspension is stirred at room temperature for one hour, methylene chloride is added and the resultant solution washed successively with aqueous solutions of sodium thiosulfate, 10% sulfuric acid and sodium carbonate, and then washed with water. After being dried, the solvent is removed under reduced pressure. The residue is chromatographed on activated magnesium silicate. The acetone-petroleum ether eluate (41:9) gives a solid which is the product of the example.

EXAMPLE V

Preparation of 9α,11β - Dichloro - 21-Hydroxy-16α,17α-Isopropylidenedioxypregna-1,4-Diene-3,20-Dione (VI)

A stirred mixture of 0.435 g. of 21- acetoxy-9α,11β- dichloro-16α,17α-isopropylidenedioxypregna - 1,4 - diene-3,20-dione (V) in 40 ml. of 0.27 N perchloric acid in methanol is kept at room temperature 18 hours whereupon solution has occurred. The solution is poured into water giving a precipitate which is filtered to give 0.3 g. of product. Recrystallization from acetone-petroleum ether gives the product of the example, melting point 229.5–230° C.

We claim:
1. A compound of the formula:

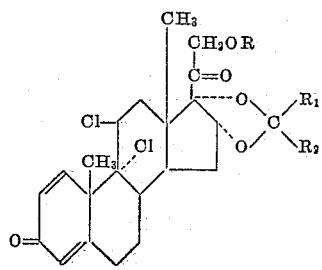

wherein R is a member of the group consisting of hydrogen and lower alkanoyl radicals, $R_1$ is a member of the group consisting of hydrogen and lower alkyl radicals, and $R_2$ is a lower alkyl radical.

2. The compound 21-acetoxy-9α,11β-dichloro-16α,17α-isopropylidenedioxypregna-1,4-diene-3,20-dione.

3. The compound 9α,11β-dichloro-21-hydroxy-16α,17α-isopropylidenedioxypregna-1,4-diene-3,20-dione.

References Cited in the file of this patent
UNITED STATES PATENTS
2,894,963    Gould et al. _____ July 14, 1959

OTHER REFERENCES
Fried et al.: J.A.C.S., vol. 80 (1958), pp. 2338–2339.